United States Patent
Branscomb

(10) Patent No.: US 9,385,531 B2
(45) Date of Patent: Jul. 5, 2016

(54) SYSTEM AND METHOD FOR OPTIMIZING RETURNS OF POWER FEEDSTOCK PRODUCERS

(76) Inventor: Bennett Hill Branscomb, San Francisco, CA (US)

( * ) Notice: Subject to any disclaimer, the term of this patent is extended or adjusted under 35 U.S.C. 154(b) by 568 days.

(21) Appl. No.: 13/217,066

(22) Filed: Aug. 24, 2011

(65) Prior Publication Data

US 2012/0053748 A1    Mar. 1, 2012

Related U.S. Application Data

(60) Provisional application No. 61/376,376, filed on Aug. 24, 2010.

(51) Int. Cl.
*H02J 4/00* (2006.01)
*G05B 13/02* (2006.01)
*H02J 3/00* (2006.01)
*H02J 3/14* (2006.01)

(52) U.S. Cl.
CPC ........... *H02J 3/008* (2013.01); *H02J 2003/146* (2013.01); *Y04S 50/10* (2013.01)

(58) Field of Classification Search
USPC ........................................................ 700/295
See application file for complete search history.

(56) References Cited

U.S. PATENT DOCUMENTS

| | | | |
|---|---|---|---|
| 7,647,207 B2 | 1/2010 | McConnell et al. | |
| 2002/0143693 A1 | 10/2002 | Soestbergen et al. | |
| 2003/0116315 A1* | 6/2003 | Wellington et al. | 166/256 |
| 2004/0110044 A1* | 6/2004 | McArthur et al. | 429/13 |
| 2004/0200393 A1 | 10/2004 | Zauderer | |
| 2005/0154669 A1 | 7/2005 | Streetman | |
| 2006/0032788 A1 | 2/2006 | Etter | |
| 2006/0053791 A1* | 3/2006 | Prentice, III | 60/645 |
| 2006/0089851 A1 | 4/2006 | Silby et al. | |
| 2006/0106635 A1 | 5/2006 | Ulrich et al. | |
| 2006/0184445 A1 | 8/2006 | Sandor et al. | |
| 2006/0208571 A1* | 9/2006 | Fairlie | 307/11 |
| 2006/0289211 A1* | 12/2006 | Mashiki | 180/65.2 |
| 2007/0107958 A1* | 5/2007 | Oliver | 180/65.4 |
| 2008/0052145 A1* | 2/2008 | Kaplan et al. | 705/8 |
| 2008/0059814 A1* | 3/2008 | Esliger | 713/300 |
| 2008/0203734 A1* | 8/2008 | Grimes et al. | 290/40 R |
| 2009/0157534 A1 | 6/2009 | Arsiwala | |
| 2010/0077752 A1* | 4/2010 | Papile | 60/641.8 |
| 2010/0138098 A1* | 6/2010 | Takahara et al. | 701/29 |
| 2012/0021303 A1* | 1/2012 | Amendola et al. | 429/406 |
| 2012/0125029 A1* | 5/2012 | Moreau | 62/235.1 |

OTHER PUBLICATIONS

International Search Report and Written Opinion received to referenced case U.S. Appl. No. 12/047,204 for International Patent Application No. PCT/US08/59210 dated Aug. 8, 2008.
Sven Wunder, The Efficiency of Payments for Environmental Services in Tropical Conservation, Feb. 2007, Conservation Biology, vol. 21, 1-58.
Kenneth M. Chomitz, Financing environmental services: the Costa Rican experience and its implications, May 1999, The Science of the Total Environment 240 (1999) 157-169.

* cited by examiner

*Primary Examiner* — Robert Fennema
*Assistant Examiner* — Tao Peng
(74) *Attorney, Agent, or Firm* — Blank Rome LLP

(57) ABSTRACT

A system and method for optimizing the returns of power feedstock producers includes automated selection between selling raw feedstock or generating power and storing it in a storage device for subsequent sale under more favorable market conditions. The system may comprise grid-scale electric power storage devices which enable a feedstock supplier—e.g., a natural gas producer—to utilize real-time market data to allocate a feedstock between its sale "as is"—i.e., as fuel or chemical feedstock—and use of the feedstock to produce electric power which may be stored for later sale when the market price for peaking electric power is favorable. In certain embodiments, the system may be entirely automated and the collection of market data, the allocation of feedstock and the generation and subsequent supplying of electric power to a grid may be entirely performed by the system without operator intervention.

2 Claims, No Drawings

SYSTEM AND METHOD FOR OPTIMIZING RETURNS OF POWER FEEDSTOCK PRODUCERS

CROSS-REFERENCE TO RELATED APPLICATIONS

This application claims the benefit of U.S. Provisional Application No. 61/376,376, filed on Aug. 24, 2010.

STATEMENT REGARDING FEDERALLY SPONSORED RESEARCH OR DEVELOPMENT

Not Applicable

BACKGROUND OF THE INVENTION

1. Field of the Invention

This invention relates to electricity generation. More particularly, it relates to allocating certain energy feedstocks to power storage devices.

2. Description of the Related Art Including Information Disclosed Under 37 CFR 1.97 and 1.98.

Production companies today produce energy feedstocks, such as natural gas, fuel oil and coal. They transport and sell these raw feedstock items to, among others, producers of power such as electric utilities. Energy feedstock includes but is not limited to oil, natural gas, coal and other combustible or natural systems. These products are used to create heat, electricity and other important uses.

Operating "netback" is a financial metric used specifically in the oil and gas industry as a benchmark to compare performance between time periods, operations and competitors. It is a measure of oil and gas sales net of royalties, production costs, transportation, taxes, and any other expenses such as the allotted downstream cost of $CO_2$. Today, as feedstock flows downstream, producers lose control. Producers seek to optimize their netback from their produced feedstock. An additional cost to production is that partially depleted but still-producing natural gas wells often require gas compression to raise the gas from such lower-pressure wells to line pressure for transporting pipelines. This cost across the multitude of quick-to-deplete shale gas wells will likely become a greater overall component in the reduction of the operating netback.

The measure of netback is generally calculated based on the oil or gas selling unit—e.g., per barrel in the case of oil or per 100 cubic feet ("CCF" or "Ccf") in the case of natural gas. An alternative unit for gas, the therm, is a non-SI unit of heat energy equal to 100,000 British thermal units (BTU). It is approximately the energy equivalent of burning 100 cubic feet (often referred to as 1 Ccf) of natural gas.

Since gas meters measure volume and not energy content, a therm factor is often used by gas companies to convert the volume of gas used to its heat equivalent, and thus calculate the actual energy use. The therm factor is usually in the units therms/Ccf. It varies with the mix of hydrocarbons in the natural gas. Natural gas with a higher-than-average concentration of ethane, propane or butane will have a higher therm factor. Impurities, such as carbon dioxide or nitrogen, lower the therm factor.

The volume of the gas is calculated as if measured at standard temperature and pressure (STP). The heat content of natural gas (per unit of mass) is solely dependent on the composition of the gas, and is independent of temperature and pressure.

Netback may be calculated by subtracting certain costs from the selling price of a feedstock. For example, suppose an oil company's Canadian operation sells oil at an average of $80 per barrel. If royalties, production and transportation costs equal $25, $15 and $18, respectively, for each barrel produced, the operating netback for the Canadian operation equals $22 per barrel. The calculated operating netback may be compared to that specific operation's past performance or to a competitor's performance in the same region. The determination of these values can be automated and made more granular as the spot market of the price of oil, gas and coal fluctuates in the world markets. Netback can be calculated on a per-well or per-facility basis.

Not only does the energy feedstock producer look to compare performance from land lease royalties, production costs and transport, it may also set up hedging activities in the marketplace. Hedging has become another important activity for production companies to balance their capital investment, reserve development, and production sales cycles. The problem is that the market of producers and timing of this cycle is disconnected from the eventual sales price of the product. There are too many reasons for this disconnect to make the prediction of the price they will receive as the netback of their sales. Some of the factors include the economic climate, weather, regional supply and mineral owner leasehold requirements.

Feedstock producers may drill and complete oil and gas wells. In the case of natural gas, it is generally conditioned for market at the well head or at gathering plants. At the point of entry, it is cleaned and made ready for combustion and put into pipelines which move it to market. There are a number of costs along the way which include transport and gas contract assessment of market prices on a daily and sometimes hourly basis. Generally, producers cannot control the sales price of their product as the market determines the spot price and these producers are subject to market pricing at any given time. Moreover, traders with large international hedge funds move these markets for speculative purposes. Lastly, the dynamics of energy production have been changed by the evolution of shale gas explorations and production and methods to mine this feedstock. Fundamentally, the world of exploration and risk in this business has shifted to where expected return on investment is less but the risk associated with achieving the returns has also been lowered. Hence, exploration for natural gas in shale is more often referred to as mining. Consequently, reserves are massive and oversupply has become the critical problem. Competition for these mineral lands, short term mineral lease provisions and strict continuous drilling provisions drive producers to drill more wells than might be prudent, as shut-in gas provisions require in most cases continued royalty provisions to the mineral owner. These shut-in gas provisions force the producer to sell gas even in times of low pricing. While natural gas is a featured feedstock this invention applies to all energy producers of various forms of feedstock.

Downstream from the producers are generators of power such as electricity. Further downstream from the power generators are power consumers, i.e. customers. Because power demands are often higher at certain times of day, the price of a kilowatt-hour (KWH) of electricity can vary dramatically. For instance, during a typical day in California, the price of electricity can fluctuate from $1/10$ of one cent per KWH to around 3.5 cents per KWH. This situation lends itself to opportunity if short term power supplies such as battery-stored electricity can be introduced into the grid at or near the peak price times. What producers need is an automated system that determines whether, at any given moment, the raw feedstock should be sold as is, or whether the producer should turn that feedstock into electricity and store it for later sale. Further, the system may determine, using real-time data, the best times to sell electricity onto the grid. Finally, the system may preferably be configured to automate all actions to effect sale of feedstock or electricity generation, once determinations are made, rather than requiring human intervention.

BRIEF SUMMARY OF THE INVENTION

A system and method comprising grid-scale electric power storage devices enables a feedstock supplier—e.g., a natural gas producer—to utilize real-time market data to allocate a feedstock between its sale "as is"—i.e., as fuel or chemical feedstock—and use of the feedstock to produce electric power which may be stored for later sale when the market price for peaking electric power is favorable.

In certain embodiments, the system may be entirely automated and the collection of market data, the allocation of feedstock and the generation and subsequent supplying of electric power to a grid may be entirely performed by the system without operator intervention.

DETAILED DESCRIPTION OF THE INVENTION

The present invention allows a global network software system which integrates battery storage and independent generators as distributed and controllable objects to become part of the electric grid and carbon banking system. It integrates the ability of energy producers to dynamically assess independently, worldwide, in real time through the internet, critical financial metrics which assess the best use of the feedstock assets for sale. It may provide for direct control and redirection of the feedstock through valves, electric generation storage of this electricity into battery systems (or other energy storage systems) and the release and production of electricity into the grid at times of demand and or low prices for the feedstock. The decision to store electricity by utilizing the feedstock or to bank the energy as a hedge or reserve for times of high electricity price may be dynamically implemented. This system of control, banking, storing forward, sale, and lastly sequestration is made possible as these activities or a portion of them are executed at or near the source of production or significant storage locations of the feedstock.

In the past, it has been notoriously difficult to store electric power. Some systems utilize pumped storage wherein excess electric power is used to pump water to a higher elevation and later recover at least a portion of the energy by using the elevated water to run a turbine generator. Similarly, air compressors may be used to pressurize a storage chamber (which may be an underground salt dome). Subsequently, at periods of high demand, the pressurized air may be used to power an air motor connected to a generator or alternator. Even flywheels have been proposed as a method of storing energy for later conversion into electricity.

Recently, however, new battery technology has become available which permits the construction of grid-scale batteries for electric power storage. One such battery is a sodium-sulfur battery or liquid metal battery which is a type of molten metal battery constructed using sodium (Na) and sulfur (S). This type of battery has a high energy density, high efficiency of charge/discharge (89-92%) and long cycle life, and is fabricated from inexpensive materials. However, because of operating temperatures of 300 to 350° C. and the highly corrosive nature of the sodium polysulfides, such cells are primarily suitable for large-scale, non-mobile applications such as grid energy storage. Whereas other new battery technology lends itself to mobile applications.

Other types of grid-scale Battery Energy Storage Systems (BESS) are also commercially available. By way of example, Exergonix, Inc. (Lee's Summit, Mo. 64064) offers a 1 MW BESS in a fully independent enclosure that incorporates the storage system, bidirectional converter, power controls and system voltage controls. The storage system comprises an array of lithium polymer batteries that use nano materials which are said to provide significant increases in power, energy and cycle life.

The system and method of the present invention allows producers using such grid-scale storage devices to act locally but operate regionally and nationally. One particular preferred embodiment of this invention comprises a distributed network of devices which communicate to a central decision processor to automate and allocate feedstock from natural gas gathering plants and wellheads for the purpose of either selling raw feedstock, or generating electricity for either immediate sale or storing forward in grid-scale battery stores. The system controls delivery systems which are connected to the utility grid or to pipelines and plants to which producers contract natural gas sales. The battery storage systems may be made portable, if needed, by their installation on trucks, trains or other vehicles for delivery to the customer's site as part of a pre-defined relationship between the producer and consumer. A contractual relationship may spell out the delivery requirements as per the customer's needs, but where electricity is a component of this delivery, the producer may find creative ways to utilize the systems and add more electricity store—forward delivery systems to dynamically improve its netback. As described herein, and in commonly-owned U.S. patent application Ser. No. 12/047,204 filed Mar. 12, 2008, entitled System and Method for Banking Downstream Resource Costs" and U.S. patent application Ser. No. 12/488, 056 filed Jun. 19, 2009, entitled "Community to Address Carbon Offsets," the disclosures of which are hereby incorporated in their entireties by reference, the producer may provide battery storage systems to a customer in a way that triggers of one or more carbon credits as part of a carbon banking system.

Given the complexity of the real time and local pricing of peak and off peak electricity by utility companies and the lack of pricing control for the wholesale price of natural gas per unit because of competition and supply and demand in regional and local environments, this system uses dynamic decision processors and accounting processors to dynamically control and manage the sale of feedstock for the producer to its market by incorporating the sale of electricity in real time, the storage of electricity in times of low pricing of natural gas for future delivery of electricity in times of peak pricing and a hybrid of cogeneration at the wellhead or in a hybrid configuration where storage and control is provided at the customer site. To maximize netback to the producer, the system must take into account all expense issues discussed previously and the impact on day gas supply contracts, i.e. if the producer has a minimum amount to deliver in a month or face penalties. The system must also take into account the storage capacity of the battery banks and incremental costs of adding additional battery capacity.

This system is designed to create private virtual networks inside its overall global processor to provide the producer autonomy from its competitors while providing services to a multiplicity of producers. In other words, each producer may provide and utilize its own system or a service provider may provide a system that is accessible by multiple producers. Utilizing the present system, a service provider or group of producers may create a club of producers, their customers, their transport suppliers, and the utilities with a cloud for communicating real-time data and aggregating supply price and sales processors with decision processors to improve their netback. Object base computing design where preferences for independent objects may be utilized to integrate the overall sequencing of decisions made by the producer or agent of the producer.

As anticipated, natural gas which is burned at the gathering plant where the $CO_2$ is sequestered, provides for the most efficient use, and generates carbon credits that the system may store and account for in this banking and accounting cloud as a coupon to be sold or provided to the market for sale. The accounting for these carbon credits may be combined inside this central banking center for producers and an additional value proposition in the business process.

The system literally controls and, in certain embodiments, may include electronically-controlled valves and switches to control whether the feedstock is sold as is (i.e., as a hydrocarbon supplied via pipeline or tanker) or directed to electricity generating devices, preferably on site. The system may control switches that either direct produced electricity onto the grid for immediate sale, into grid-scale batteries for later sale, or connect the storage batteries to the grid to thereby sell previously-stored electricity.

A component of this preferred embodiment utilizes the ability to manage the rate of storage of electricity by generating and the delivery of electricity by burst. Battery technology is capable of storing a much smaller total capacity while, upon request, delivering a large burst. For example a battery system may store 500 KWH, but, upon request, deliver a one-megawatt burst. This is made possible by low impedance designs in new battery technology. Thus, a preferred example of the logic might be: at a given time the spot price of natural gas has dropped below a predefined threshold based upon the finding cost of this producer and minimum return necessary for the gas. Also, the current price of electricity may be too low to justify selling electricity. However, the system may have battery capacity remaining, so the system automatically diverts produced natural gas to generators that are in turn connected to charge up battery stores for later sale of electricity when prices become favorable. At times, when both gas prices and electricity prices are high, the system may be transporting and selling raw feedstock and simultaneously selling battery-stored electricity. The system gives the producer the ability to achieve the highest value for its feedstock at all times, greatly improving netback.

On the sale side, in a preferred example, assume that peak demand has moved for the moment to 3½ cents per KWH or 20 times the average price in the local market. The system might then burst all the electricity stored in the batteries and sell into the grid at a one-megawatt rate to capture the full value of the monetary high price. Movement or flow of this logic is refined to take into account the pricing as it rises, the likelihood it will continue to rise and the amount to sell into a rising trend based upon interpretation of current dynamic real time data from the data input side of the system.

Other systems which have been proposed take into account the measurement of the individual pollutants in $CO_2$ for banking these costs as disclosed in the patent applications incorporated by reference herein. This system provides for a hybrid and integrated set of dynamic network processors to incorporate the generation of electricity onsite or at a gas storage site to augment the options producers have, and create a new significant option to convert, store, sequester $CO_2$ into electricity in order to compete with the dynamics of the commodity trading marketplace and their netback as compared to their competitors. This invention may utilize one or more communications networks, one or more servers, and one or more databases or storage devices, real time information access to market pricing, input devices to receive information and parameters from administrators' store-forward battery installations, battery management tools to manage burst capabilities, communications to generators, electronically controlled valves and switches, measurement devices, management of charge and discharge as "objects" in a distributed computing environment where preference and their performance may be customized for each customer based upon his or her competitive strategies and customer requests. These objects take into account contract conditions, transportation conditions, regional and local pricing of electricity in real time, spot prices of natural gas oil and coal. These objects measure, for accounting, the amount of $CO_2$ which is birthed at the well head by the producer, that which is burned and sequestered, the value of this process as carbon credits which become accounted for and moved into their account through national credit, banking and market services.

In summary, the producer of oil, gas or other such feedstock is subject downstream to a host of dynamics which he or she cannot control related to pricing, and the disposition of the cost side of the pollutants which comes from feedstock. There is a substantial disconnect between proven but not yet produced reserves, capital and leasehold timing requirements to birth these proven reserves and bring to market and their ultimate operating netback revenues. The system of the present invention provides for a dynamic way to incorporate real time market dynamics that may include (but are not limited to) the spot price of natural gas, oil or the price of coal, the spot price of local electricity with a new potential store forward metric—i.e., potential stored electricity. This new alternative product provides the ultimate just-in-time delivery mechanism for producers to further hedge and augment the price variance inefficiencies in the market place. Furthermore, since $CO_2$ has a cost in the market, the generation of store-forward electric systems close to the production resource provides efficiencies that convert to carbon credits to add an additional revenue opportunity.

The system of the present invention, including its object-based system software and necessary banking and other installed physical components integrates a new value proposition for producers and their customers.

Although the invention has been described in detail with reference to certain preferred embodiments, variations and modifications exist within the scope and spirit of the invention as described and defined in the following claims.

What is claimed is:

1. A system for apportioning a stream of produced hydrocarbon fuel comprising:
    an electric power generator that is capable of generating electric power from the produced hydrocarbon fuel;
    a battery electrically connected to the generator and capable of storing the electric power generated from the hydrocarbon fuel, said battery configured for selective connection to an electric power grid;
    at least one electronically controlled valve configured to apportion the stream of produced hydrocarbon fuel between the electric power generator and a downstream fuel distributor; and,
    a processor-based subsystem containing instructions for causing the processor to
        receive information concerning the market price of the produced hydrocarbon fuel sold to the downstream fuel distributor;

receive information concerning the market price of electric power delivered to the electric power grid;

calculate a first portion of the stream of produced hydrocarbon fuel for delivery to the electric power generator wherein the calculated first portion is based upon the information concerning the market price of the produced hydrocarbon fuel sold to the fuel distributor and the information concerning the market price of electric power delivered to the electric power grid;

calculate a second portion of the stream of produced hydrocarbon fuel for delivery to a fuel distributor wherein the calculated second portion is equal to the total stream of produced hydrocarbon fuel minus the first portion and, actuate the at least one electronically controlled valve to apportion the first portion of the stream of produced hydrocarbon fuel to the electric power generator and the second portion of the stream of produced hydrocarbon fuel to the downstream fuel distributor.

2. The system recited in claim 1 further comprising:

a switch controlled by the processor-based subsystem configured to connect the battery to the electric power grid; and, instructions stored in the processor-based subsystem for causing the switch to connect the battery to the electrical power grid at a time and for a duration based at least in part on the information concerning the market price of electric power delivered to the electric power grid.

\* \* \* \* \*